Nov. 5, 1963 J. F. McGIVERN, JR 3,109,756

THERMOELECTRIC DEVICE

Filed Aug. 23, 1961 2 Sheets-Sheet 1

INVENTOR.
JAMES F. McGIVERN, JR.

Nov. 5, 1963 | J. F. McGIVERN, JR | 3,109,756

THERMOELECTRIC DEVICE

Filed Aug. 23, 1961 | 2 Sheets-Sheet 2

*INVENTOR.*
JAMES F. McGIVERN, JR.

3,109,756

THERMOELECTRIC DEVICE

James F. McGivern, Jr., Philadelphia, Pa., assignor to The Electric Storage Battery Company, a corporation of New Jersey Filed Aug. 23, 1961, Ser. No. 133,499
7 Claims. (Cl. 136—4)

The present invention generally relates to thermoelectric devices and more particularly to a new and improved thermocouple characterized by an exceptionally high thermoelectric power output at moderate temperatures and with relatively small temperature differentials.

Of the many phenomena or effects inter-relating the electrical and thermal forms of energy three are of particular interest with respect to the present invention. The first of these is the Seebeck effect which is exemplified by the electromotive force which is produced when wires of two different metals are joined at their ends to form a conductive circuit and the junctions are maintained at different temperatures. The electromotive force in the circuit depends on the two metals employed and the temperatures of the junctions. The current depends on the resistance of the circuit as well. The second of these thermoelectric effects is the Peltier effect which is the inverse of the Seebeck effect, namely, that when current flows across the junction between two different conductors, heat is either generated or absorbed, depending on the sense of passage of current across the boundary. The heat generated or absorbed is proportional to the first power of the current. The third associated effect is the Thomson effect, i.e., if a temperature gradient exists in a conductor, an electrical potential gradient is also brought into existence. The thermoelectric device of the present invention has exhibited all three of these inter-related effects.

A general object of the present invention is to provide a thermoelectric device having an electrical output of an order of magnitude greater than has heretofore shown to be possible, i.e., on the order of millivolts per degree centigrade temperature difference as opposed to tenths of millivolts per degree centigrade temperature difference and at temperatures in the vicinity of that of boiling water.

Another object of the present invention is to provide a thermoelectric device in which the junctions can be produced by the utilization of chemical means as well as mechanical means.

Still another object of the present invention is to provide a new and improved thermoelectric device which is economical to produce and which is characterized by an ability to be made in many physical configurations to provide the geometric configuration which will respond best to the prevailing thermal conditions in such a manner as to maintain high efficiencies, thereby adapting it to a multitude of uses.

The present invention is characterized by the utilization of lead and lead dioxide to produce a thermoelectric output under certain conditions of thermal energization. In accordance with one form thereof, a base rod or other geometric configuration of lead or lead alloy is anodized under such conditions at to form thereon a layer of lead dioxide. When a thermal gradient exists between locations on such a configuration, voltage differences proportional to these gradients also exist. While the mechanism responsible for these voltage gradients is not fully understood, it is believed that they are due to differences in electron excitation at the hot and cold locations in both materials which can be supported because of the existence of an asymmetrical electrical barrier between the two materials. This asymmetrical electrical barrier is attributed to an intermediate oxygen deficient oxide layer. It should be understood that this barrier exists most particularly when the oxide layer is produced directly from a lead substrate and at the expense of the same. Thermoelectric devices in accordance with the present invention may also be constructed by producing mechanical contacts, as by pressure, between lead and lead dioxide with suitable intermediate electrical conductors between the discrete junctions. In this construction as in the conventional construction of thermocouple junctions by the joining of wires of two different metals, the appearance or non-appearance of a rectifying barrier at the junction is of consequence only in that it contributes to the overall electrical resistance of the unit.

A better understanding of the present invention may be had from the following description when read with reference to the accompanying drawings of which:

Figure 1:
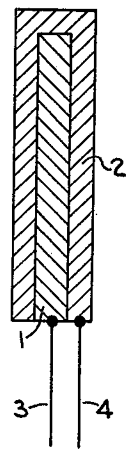
FIG. 1 is a cross-sectional view of one form of a thermoelectric device in accordance with the present invention.

Referring now to FIG. 1, the numeral 1 designates a substrate of lead or lead alloy having on the surface thereof a layer of lead dioxide 2, produced by anodization or direct oxidation. Electrical contacts 3 and 4 are made with the substrate 1 and oxide layer 2 respectively. Thermoelectric devices as shown in FIG. 1 have been shown to exhibit pronounced thermoelectric properties. For example, a lead rod 0.10 inch in diameter and 2 inches in length was anodized for 2 weeks at a current of 1 milliampere per sq. centimeter in sulfuric acid of 1200 specific gravity. At the end of that time, the lead rod was removed from the anodizing bath, washed and dried and the electrical contacts shown made therewith. The lead base utilized was an alloy of lead and 11% antimony. Such a configuration exhibited a thermoelectric output of approximately 1600 microvolts per degree centigrade temperature differential between the contact end and the opposite end thereof. The total electrical output of such a device diminishes, however, as the thermal conductivity of the element establishes an equilibrium temperature distribution along the length of an element, the voltage sensitivity remaining the same.

Figure 2:
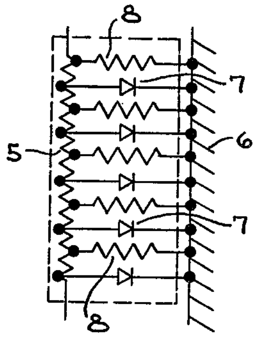
FIG. 2 is an electrical equivalent circuit of the device shown in FIG. 1.

This construction can be looked upon as a pair of coaxial conductors decoupled along their lengths by imperfect or leaky diodes. Referring now to FIG. 2, there is shown a suggested electrical equivalent circuit for such a device. In this equivalent circuit the resistor 5 represents the longitudinal electrical resistance of the lead dioxide film and the numeral 6 represents the lead base. As shown, the oxide layer 5 and the lead base 6 are coupled in the transverse direction by a system of parallel diodes 7 and resistors 8, representing diode leakage. As mentioned hereinbefore, the diodes are attributable to an intermediate oxygen deficient layer between the oxide film 5 and the lead base 6. The decoupling between the oxide layer and the lead base has been found to improve with age. This improvement of the asymmetrical electrical barrier between the two materials is attributed to a solid state reaction between the lead substrate and the lead dioxide layer to yield an intermediate oxide of lower oxygen content which may be lead oxide. This solid state reaction is thought to be expressed by the following equation:

$$Pb+PbO_2 \rightarrow 2PbO$$

Figure 3:
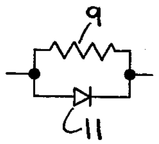
FIG. 3 is a further simplified electrical equivalent circuit of the device shown in FIG. 1.

For simplicity, the electrical equivalent circuit of a thermoelectric device as shown in FIG. 1 may be considered to comprise simply a resistor 9 shunted by a diode 11 as shown in FIG. 3.

The output voltage achieved from a thermoelectric device having the configuration shown in FIG. 1 is almost purely attributable to the Thomson voltages produced in the two materials by the temperature gradient existing along their lengths. As will be understood by those skilled in the art, the electrical output from a device such as that shown in FIG. 1 may be improved by utilizing more advantageous geometrical configurations. For example, since the thermal conductivity of lead is quite high the utilization of a thinner lead substrate will produce higher equilibrium outputs for a given sustained temperature differential.

Figure 4:
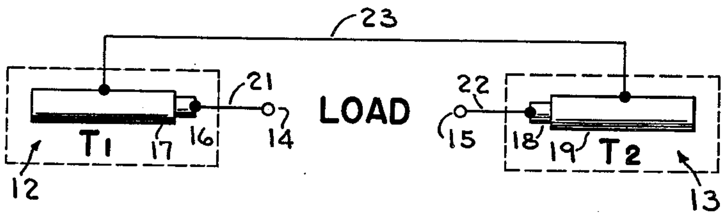
FIG. 4 is a conventional thermocouple circuit utilizing the thermoelectric device of FIG. 1.

Referring now to FIG. 4, there is shown a conventional thermocouple circuit utilizing the thermoelectric device of FIG. 1. This thermocouple comprises a pair of junctions generally designated 12 and 13 which are maintained at temperatures $T_1$ and $T_2$ respectively to produce an electrical output between a pair of output terminals 14 and 15. As shown, the junction 12 comprises a lead substrate 16 in the form of a rod having anodized thereon a layer of lead dioxide 17. Similarly, the junction 13 comprises a lead substrate 18 also in the form of a rod having a layer of lead dioxide 19 anodized thereon. The lead substrates 16 and 18 are connected to the output terminals 14 and 15 respectively by means of the conductors 21 and 22. The oxide layers 17 and 19 are connected to each other by means of the conductor 23. The conductors 21, 22, and 23 may advantageously be made of a good electrical conductor such as copper and inasmuch as they are homogeneous, contribute nothing to the thermoelectric output of the device.

Figure 5:
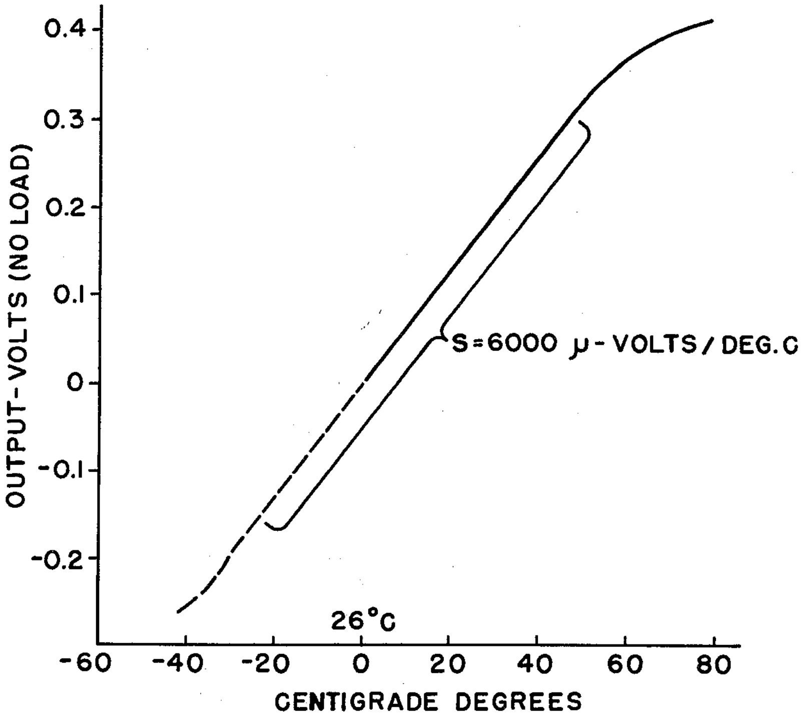
FIG. 5 is a graph illustrating the no-load thermoelectric power characteristics of the thermocouple of FIG. 4.
Figure 6:
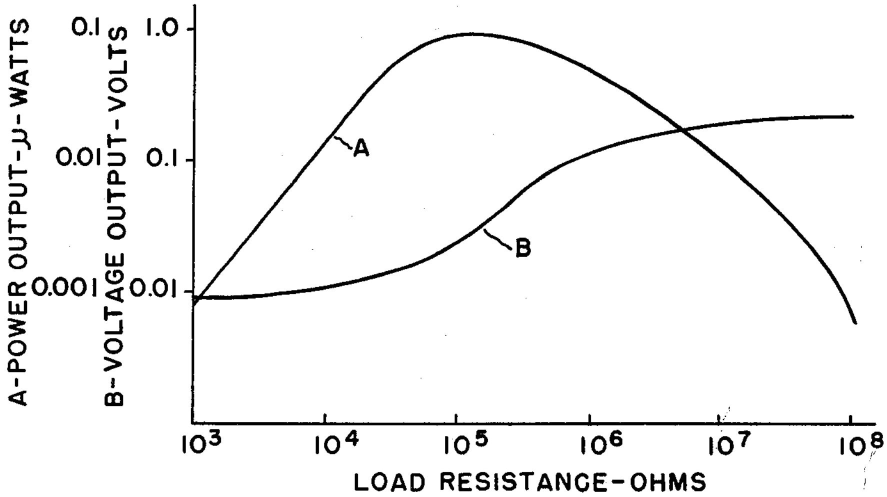
FIG. 6 is a graph illustrating the thermoelectric power characteristics of the thermocouple of FIG. 4 shown under various load conditions under certain conditions of thermal energization.

FIGS. 5 and 6 illustrate the electrical characteristics of a thermocouple constructed as shown in FIG. 4. Referring specifically to FIG. 5, there is shown a graph illustrating the thermoelectric output characteristics of the thermocouple of FIG. 4 with the no-load output voltage plotted as the ordinate and temperature in degrees centigrade as the abscissa. The thermocouple configuration utilized to provide the output plotted in the graph of FIG. 5 comprised a pair of lead alloy rods approximately 2 inches in length and 0.1 inch in diameter, anodized for a period of 2 weeks under the conditions specified hereinbefore with respect to the explanation of FIG. 1. The measurements were made with a voltmeter having an input impedance of 100 megohms and the cold junction was maintained at 26° C. As will be obvious from an examination of the curve of FIG. 5, a thermoelectric device thus constructed provides in its linear range a Seebeck coefficient of 6,000 microvolts per degree centigrade which is an order of magnitude higher than that which has heretofore been obtainable from known thermoelectric devices.

FIG. 6 illustrates the electrical output characteristics of a thermocouple of FIG. 4 under various load conditions. These measurements were made with the hot junction maintained at 120° C. and the cold junction at 26° C. As should be expected, curve A, which represents the power output of the device, was hyperbolic in nature going through a maximum when the output impedance of the thermocouple matched the impedance of the load. Curve B, which shows the voltage output of a thermocouple in accordance with the present invention under load is of course the reciprocal of the power curve.

Thermal electric devices which will provide high thermal conversion efficiencies must exhibit if possible at one and the same time, high values of thermoelectric power or Seebeck E.M.F., low resistivity and low thermal conductivity. Metals and metallic alloys exhibit low values of Seebeck E.M.F. and resistivity and simultaneously high values of thermal conductivity. Oxides, on the other hand, exhibit high values of Seebeck E.M.F. and moderately high resistivity and simultaneously, low values of thermal conductivity. With regard to the metal base and oxide layers utilized in the thermoelectric device of the present invention, these conditions have been found to hold true with substantially all of the Seebeck E.M.F. being produced from the oxide layer with the base metal a non-contributor. However, inasmuch as the oxide layer can readily be formed from and at the expense of the lead substrate and with a sufficient degree of electrical decoupling to permit the utilization of the Seebeck output from the oxide layer it will be seen by those skilled in the art that the present invention provides a thermocouple characterized by simplicity of construction and ease of manufacture. Still further, this thermoelectric device provides outputs at moderate temperatures and with moderate temperature differentials which are in order of the magnitude higher than those heretofore reported.

The thermoelectric devices described in detail hereinbefore were constructed by the formation of a lead dioxide layer on and from a base layer of lead alloyed with 11% antimony. It should be understood, that it is not necessary that the lead dioxide be formed from the base layer and that other constructions can be utilized where the output is not dependent on the maintenance of a rectifying boundary between the materials. For example, powdered lead dioxide can be pelletized and pressed onto a base of lead or lead alloy. It should also be understood that pure lead or alloys of lead and other metals or semimetallic constituents may be utilized to practice the present invention. Where, however, the lead dioxide is to be produced by the direct oxidation or anodization of the lead base or alloy, consideration must be given to the nature of the device if the asymmetrical electrical boundary between the substrate and the oxide layer is to be relied upon to support potential differences. As has been previously explained, the nature of this boundary is believed to be such as to have an electrical equivalent circuit comprising a network of diodes parallel by resistances which age to high values such that the lead and the oxide are essentially decoupled electrically in one direction. In this respect, the paralleling resistances or diode leakage paths appear to be derived from surface discontinuities in the base on which the oxide layer is formed. Surface discontinuities such as grain boundary, impurity sites and the like are known to give rise to defects in the oxide layers derived therefrom. Since these paralleling resistances support internal current within the thermoelectric device which diminish the voltage available to an external load, it is obvious that there is merit in limiting the length of such thermoelectric elements so as to reduce the number of these leakage paths. Because there are two ends to an element, however, the minimum number of discontinuities which can exist is two. Competing with this is the fact that a certain quantity of junction area is required in order to provide any given quantity of desired power output. With respect to the thermoelectric elements described hereinbefore, it has been observed that a maximum output can be obtained when these are approximately ⅝" in length.

Inherent in a device utilizing a lead base is the problem of conduction of heat from the hot end or junction to the cold end or junction, unless a conventional construction such as that shown in FIG. 4 is utilized. Of course, even in the construction shown in FIG. 1 the hot and cold ends may be made more thermally remote by increasing the length of the element within the limits of tolerable internal loss. Alternately, it is possible to introduce into the geometry employed, strictures of such a nature that there is provided a greater decrease in thermal conductivity than in overall electrical conductivity. As has been noted hereinbefore, the thermoelectric device of the present invention is readily adapted to other geometric configurations since the junction can be formed by oxidation or anodization on a base cast or otherwise shaped to the desired configuration.

Having described the present invention, that which is claimed as new is:

1. A thermoelectric device comprising a pair of joined thermoelectric elements, one of said elements being lead dioxide and the other of said elements being a metal selected from the group consisting of lead and alloys of lead, hot and cold junctions existing at the boundary between said elements as a result of thermal gradients along said device.

2. A thermoelectric device comprising a pair of joined thermoelectric elements, one of said elements being a body of lead in alloy with 11% antimony and the other of said elements being a layer of lead dioxide thereon, hot and cold junctions existing at the boundary between said elements as a result of thermal gradients along said device.

3. A thermoelectric device comprising a pair of joined thermoelectric elements, one of said elements being lead dioxide and the other of said elements being a metal base selected from the group consisting of lead and alloys of lead, said device being characterized by an asymmetrically conductive electrical boundary between said lead dioxide and said base at which boundary thermoelectric junctions exist as a result of thermal gradients across said device.

4. A thermoelectric device comprising a pair of joined thermoelectric elements, one of said elements being a rod of a metal selected from the group consisting of lead and alloys of lead and the other of said elements being a layer of lead dioxide thereon, hot and cold junctions existing at the boundary between said elements as a result of thermal gradients along said rod.

5. A method of producing a thermoelectric device which comprises the steps of anodizing a metal selected from the group consisting of lead and alloys of lead to produce a layer of lead dioxide thereon and making an electrical contact with said base and an electrical contact with said oxide layer, said metal being one thermoelectric element, said oxide layer the other thermoelectric element, and the boundary between them a thermoelectric junction.

6. The method of claim 5 wherein the oxidation of said metal is accomplished in sulphuric acid.

7. A method for producing a thermoelectric device which comprises the steps of oxidizing a metal selected from the group consisting of lead and alloys of lead to produce a layer of lead dioxide thereon and making an electrical contact with said base and an electrical contact with said oxide layer, said metal being one thermoelectric element, said oxide layer the other thermoelectric element, and the boundary between them a thermoelectric junction.

References Cited in the file of this patent

UNITED STATES PATENTS 2,856,446 McCallum -------------- Oct. 14, 1958

OTHER REFERENCES

Vinal: Storage Batteries, 4th ed., 1955, page 323.